United States Patent [19]

Miyata et al.

[11] Patent Number: 4,751,261
[45] Date of Patent: Jun. 14, 1988

[54] STABILIZED POLYVINYL CHLORIDE RESIN COMPOSITION

[75] Inventors: Shigeo Miyata; Tsutomu Nosu, both of Takamatsu, Japan

[73] Assignee: Kyowa Chemical Industry Co., Ltd., Kagawa, Japan

[21] Appl. No.: 84,842

[22] Filed: Aug. 13, 1987

[30] Foreign Application Priority Data

Aug. 14, 1986 [JP] Japan ............... 61-190834

[51] Int. Cl.$^4$ .......... C08K 5/58; C08K 5/07; C08K 5/09
[52] U.S. Cl. ............... 524/181; 524/357; 524/399; 524/433; 524/436; 524/567
[58] Field of Search ............. 524/433, 436, 567, 181, 524/357, 399

[56] References Cited

U.S. PATENT DOCUMENTS 4,221,687  9/1980  Minagawa et al. ............ 524/567
4,427,816  1/1984  Aoki et al. ............ 524/357

FOREIGN PATENT DOCUMENTS 53-000251  1/1978  Japan .
57-80444   5/1982  Japan .

OTHER PUBLICATIONS

CA 93 17532 (1983).

Primary Examiner—Veronica P. Hoke
Attorney, Agent, or Firm—Sherman & Shalloway

[57] ABSTRACT

Magnesium oxide is incorporated into a polyvinyl chloride resin composition comprising a polyvinyl chloride, a hydrotalcite, a $\beta$-diketone compound and an organic acid salt of zinc or a polyvinyl chloride resin composition comprising a polyvinyl chloride, a hydrotalcite and an organic tin compound. Bubbling as well as discoloration can be prevented in a molded article prepared from the polyvinyl chloride resin composition. Magnesium oxide having a specific surface area of at least 50 m$^2$/g and an average secondary particle size smaller than 5 $\mu$m is preferably used.

6 Claims, No Drawings

STABILIZED POLYVINYL CHLORIDE RESIN COMPOSITION

BACKGROUND OF THE INVENTION (1) Field of the Invention

The present invention relates to a stabilized polyvinyl chloride resin composition. More particularly, the present invention relates to a non-toxic polyvinyl chloride resin composition comprising a hydrotalcite, magnesium oxide, a β-diketone compound and an organic acid salt of zinc, or an organic tin compound, in which the trouble of bubbling at the molding step is eliminated.

(2) Description of the Prior Art

A polyvinyl chloride resin is a resin which is unstable against heat and light, and at the heat-molding step, thermal decomposition, which is due to dehydrochlorination, is readily caused, with the result that such disadvantages as discoloration of a molded product and reduction of the mechanical strength are brought about. In order to eliminate these disadvantages, it is necessary to add a heat stabilizer for controlling thermal decomposition, and organic compounds of metals such as Sn, Pb, Ca, Ba, Zn and Cd are used singly or in combination as the heat stabilizer. Moreover, various stabilizing assistants such as epoxy compounds, organic sulfur compounds, polyhydric alcohols and organic phosphorus compounds are used in combination with these stabilizers for improving the stabilizing effect.

With recent improvement of the living standard, the requirement for non-toxicity is increasing, and these stabilizers are reconsidered from the viewpoint of non-toxicity. When resins are used for food containers, food packaging films and medical appliances, non-toxicity of a high level is required for starting resins. As the non-toxic stabilizer meeting this requirement, there can be mentioned only organic tin compounds such as thioglycolic acid alkyl ester mercaptides of methyl tin, octyl tin and butoxycarbonyl tin, and composite metal soaps of the Ca/Zn system. The mercaptide type stabilizer of the organic tin compound, that can be used for foods, has a peculiar smell derived from mercaptan and injures the inherent flavor and quality of a food content. Since this problem of a bad smell is not involved in the Ca/Zn composite metal soap stabilizer, this stabilizer has been used in the field of packaging of drinking water, foods and alcohols. However, this stabilizer is defective in that a molded article is discolored mainly into yellow, the heat stability is poor and the transparency is poor.

Accordingly, development of a novel non-toxic smell-less stabilizer not causing discoloration in a molded article and having a high heat stability has been eagerly desired.

Under this background, we previously proposed a hydrotalcite as a novel heat stabilizer (Japanese Patent No. 1,213,856 and Japanese Patent Application Laid-Open Specification No. 80445/80). This hydrotalcite stabilizer is highly improved over the Ca/Zn composite metal soap stabilizer in heat stability and transparency, but the stabilizer is defective in that discoloration and bubbling are caused in a molded article. This defect of discoloration has been overcome by using a combination of a hydrotalcite as the stabilizer with an organic acid salt of zinc and a β-diketone compound or its metal salt or with an organic tin compound (Japanese Patent Application Laid-Open Specification No. 80444/82). As means for overcoming the problem of bubbling, there has been tried a method using a product obtained by substantially removing water of crystallization from a hydrotalcite by heating it at a temperature not higher than about 300° C. However, during the period of from the time of preparation of a stabilizer composition to the time of use of the stabilizer composition, absorption of water is caused and the problem is not practically solved. This problem of bubbling is especially serious in production of a rigid polyvinyl chloride resin molded article for which a molding temperature of about 200° C. is adopted.

SUMMARY OF THE INVENTION

We made research with a view to clarifying the causes of bubbling and solving the problem of bubbling, and as the result, it was found that the causes of bubbling are as follows: in the first place, removing of water of crystallization from a hydrotalcite begins at a molding temperature higher than about 180° C. to cause bubbling in a molded article, and in the second place, a polyvinyl chloride resin is partially decomposed at the molding temperature to generate a hydrogen chloride gas and this hydrogen chloride gas reacts with a carbon ion of the hydrotalcite to generate $CO_2$ and cause bubbling in the molded article. Accordingly, we furthered our research with a view to eliminating these two causes of bubbling, and to our great surprise, it was found that use of magnesium oxide in combination with a hydrotalcite is very effective for solving this problem.

In the present invention, it is indispensable that (1) a β-diketone compound and an organic acid salt of zinc or (2) an organic tin compound should be used as a component for preventing discoloration which is due to the hydrotalcite as the basic component of the stabilizer, and in each case use of magnesium oxide is effective and necessary for preventing bubbling.

In accordance with one aspect of the present invention, there is provided a stabilized polyvinyl chloride resin composition comprising 100 parts by weight of polyvinyl chloride resin and, incorporated therein, (a) 0.05 to 10 parts by weight of a hydrotalcite, (b) 0.01 to 5 parts by weight of magnesium oxide, (c) 0.01 to 5 parts by weight of a β-diketone compound and (d) 0.01 to 5 parts by weight of an organic acid salt of zinc.

In accordance with another aspect of the present invention, there is provided a stabilized polyvinyl chloride resin composition in which (c) 0.01 to 5 parts by weight of an organic tin compound is used instead of (c) the β-diketone compound and (d) the organic acid salt of zinc in the composition according to the first aspect of the present invention.

In the above-mentioned two compositions, the higher is the activity (higher BET specific area) of magnesium oxide and the finer is the particle size of magnesium oxide, the higher is the effect of preventing bubbling caused by the hydrotalcite. Since a high effect is attained by a small amount incorporated of magnesium oxide, high transparency given by the hydrotalcite is not substantially degraded by magnesium oxide. Furthermore, use of magnesium oxide results in attainment of additional effects of improving the light-resistant stability and preventing the chalking phenomenon.

DETAILED DESCRIPTION OF THE PREFERRED EMBODIMENTS

Hydrotalcite

The hydrotalcite used in the present invention is a compound having a crystal structure resembling that of hydrotalcite, which is represented by the following formula (1):

$$M^{2+}{}_{1-x}Al_x(OH)_2A^{n-}{}_{x/n} \cdot mH_2O \qquad (1)$$

wherein $M^{2+}$ stands for Mg or a solid solution of Mg and Zn, $A^{n-}$ stands for an anion having a valency of n, x is a positive number of $0<x<0.5$, preferably $0.2 \leq x \leq 0.4$, especially preferably $0.25 \leq x \leq 0.35$, and m is a positive number of $0 \leq m < 1$, preferably $0 \leq m < 0.2$.

As examples of the anion $A^{n-}$ having a valency of n, there can be mentioned $OH^-$, $I^-$, $ClO_4^-$, $CH_3COO^-$, $CO_3^{2-}$, $SO_4^{2-}$ oxalic acid ion $(CCO)_2{}^{2-}$, tartaric acid ion $(CHOHCOO)_2{}^{2-}$, glucolic acid ion $(CHOH)_4CH_2OHCOO^-$, fumaric acid ion $C_2H_4(COO)_2{}^{2-}$, succinic acid ion $(CH_2COO)_2{}^{2-}$, lactic acid ion $CH_3CHOHCOO^-$, $SiO_3{}^{2-}$, $Fe^{2+}(CN)_6{}^{3-}$ and $Fe^{2+}(CN)_6{}^{4-}$.

Incidentally, in view of the fact that one cause of bubbling is dissociation of water of crystallization at a temperature not higher than about 300° C., it is preferred that a hydrotalcite which has been heat-treated at a temperature not higher than about 300° C. to remove a part or all of water of crystallization be used as the hydrotalcite.

In the hydrotalcite used in the present invention, it is preferred that the crystal be sufficiently developed, agglomeration be controlled and the secondary particle size be small. More specifically, it is preferred that the BET specific surface area be less than about 50 m$^2$/g, especially less than 20 m$^2$/g, and the secondary particle size be smaller than 5 μm, especially smaller than 1 μm.

The hydrotalcite in the present invention can be prepared according to known methods, for example, methods disclosed in Japanese Patent Publications No. 2280/71, No. 30039/75, No. 32198/72 and No. 29893/81. Moreover, in order to improve the dispersibility of the hydrotalcite in the resin, it is preferred that the crystal surface be covered with an anionic surface active agent or a silane type or titanium type coupling agent. The hydrotalcite is used in an amount of 0.05 to 10 parts by weight, preferably 0.1 to 5 parts by weight, especially preferably 0.3 to 1.5 parts by weight, per 100 parts by weight of the polyvinyl chloride resin.

Magnesium Oxide

The magnesium oxide used in the present invention is not particularly critical. Since magnesium oxide reacts with H$_2$O and CO$_2$ generated from the hydrotalcite and is converted to magnesium hydroxide or magnesium carbonate or basic magnesium carbonate to prevent bubbling, it is preferred that magnesium oxide should have a high reactivity with H$_2$O or CO$_2$ and be capable of being dispersed in the form of fine particles in the polyvinyl chloride resin. More specifically, the BET specific surface area of magnesium oxide, which is a criterion of the reactivity of magnesium oxide, at least 50 m$^2$/g, preferably at least 100 m$^2$/g, especially preferably at least 150 m$^2$/g.

In view of the dispersibility, it is preferred that the secondary particle size obtained as the result of determination of the particle size distribution be smaller than 50 μm, especially less than 3 μm, particularly especially less than 1 μm. Furthermore, in order to improve the dispersibility of magnesium oxide in the resin, it is preferred that the surface of magnesium oxide be covered with an anionic surface active agent, a silane type or titanium type coupling agent or a fatty acid ester of a polyhydric alcohol.

Magnesium oxide is incorporated in an amount of 0.01 to 5 parts by weight, preferably 0.05 to 2 parts by weight, especially preferably 0.05 to 0.5 part by weight, per 100 parts by weight of the polyvinyl chloride resin.

β-Diketone Compound

The β-diketone compound used in the first aspect of the present invention is a compound represented by the following formula (2):

$$R_1-COCHR_2-CO-R \qquad (2)$$

wherein $R_1$ and $R_3$, which may be the same or different, stand for a linear or branched alkyl or alkenyl group having up to 30 carbon atoms, an alkyl group having 7 to 36 carbon atoms or an aryl or alicyclic group having up to 14 carbon atoms (the alicyclic group may include a carbon-to-carbon double bond and one of $R_1$ and $R_3$ can be a hydrogen atom), and $R_2$ stands for a hydrogen atom, an alkyl group or an alkenyl group.

As specific examples of the β-ketone compound, there can be mentioned dehydroacetic acid, dehydropropionylacetic acid, dehydrobenzoylacetic acid, cyclohexane-1,3-dione, dimedone, 2,2'-methylene-bis-cyclohexane-1,3-dione, 2-benzylcyclohexane-1,3-dione, acetyltetralone, palmitoyltetralone, stearoyltetralone, benzoyltetralone, 2-acetylcyclohexanone, 2-benzoylcyclohexanone, 2-acetylcyclohexanone-1,3-dione, benzoyl-p-chlorobenzoylmethane, bis(4-methylbenzoyl)methane, bis(2-hydroxybenzoyl)methane, benzoylacetylmethane, tribenzoylmethane, diacetylbenzoylmethane, stearylbenzoylmethane, stearoylbenzoylmethane, palmitoylbenzoylmethane, dibenzoylmethane, 4-methoxybenzoylbenzoylmethane, bis(4-chlorobenzoyl)methane, bis(3,4-methylenedioxybenzoyl)methane, benzoylacetyloctylmethane, benzoylacetylphenylmethane, stearoyl-4-methoxybenzoylmethane, bis(4-t-butylbenzoyl)methane, benzoylacetylethylmethane, benzoyltrifluoroacetylmethane, diacetylmethane, butanoylacetylmethane, heptanoylacetylmethane, triacetylmethane, distearoylmethane, stearoylacetylmethane, palmitoylacetylmethane, lauroylacetylmethane, benzoylformylmethane, acetylformylmethylmethane, benzoylphenylacetylmethane and bis(cyclohexanoyl)methane. Furthermore, metal salts of these β-ketone compounds, such as lithium, sodium, potassium, magnesium, calcium, barium, zinc, zirconium, tin and aluminum salts, can be used.

Among these β-ketone compounds, stearoylbenzoylmethane and dibenzoylmethane are especially preferred.

The β-diketone compound or its metal salt is incorporated in an amount of 0.01 to 5 parts by weight, preferably 0.1 to 1 part by weight, per 100 parts by weight of the polyvinyl chloride resin.

Organic Acid Salt of Zinc

Zinc salts of organic acids described below are used as the organic acid salt of zinc in the first aspect of the present invention. Namely, as examples of the organic acid, there can be mentioned monovalent carboxylic acids such as acetic acid, propionic acid, butyric acid, valeric acid, caproic acid, enanthic acid, caprylic acid, neodecanoic acid, 2-ethylhexylic acid, pelargonic acid, capric acid, undecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-tert-butylbenzoic acid, dimethylhyroxybenzoic acid, 3,5-di-tert-butyl-4-hydroxybenzoic acid, toluic acid, dimethylbenzoic acid, ethylbenzoic acid, cuminic acid, n-propylbenzoic acid, aminobenzoic acid, N,N-dimethylbenzoic acid, acetoxybenzoic acid, salicylic acid, p-tert-octylsalicylic acid, oleic acid, elaidic acid, linoleic acid, linolic acid, thioglycolic acid, mercaptopropionic acid and octylmercaptopropionic acid, monoesters and monoamide compounds of divalent carboxylic acids such as oxalic acid, malonic acid, succinic acid, glutamic acid, adipic acid, pimeric acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, metaconic acid, itaconic acid, aconitic acid and thiodipropionic acid, and di- or tri-ester compounds of trivalent or tetravalent carboxylic acids such as hemimellitic acid, trimellitic acid, mellophanic acid, pyromellitic acid and mellitic acid.

The organic acid salt of zinc is used in an amount of 0.01 to 5 parts by weight, preferably 0.05 to 1 part by weight, especially preferably 0.1 to 0.5 part by weight, per 100 parts by weight of the polyvinyl chloride resin.

Organic Tin Compound

As the organic tin compound used according to the second aspect of the present invention, there can be mentioned, for example, mono- or di-alkyl tin laurates such as mono- or di-methyl tin tri- or di-laurate, mono- or di-butyl tin tri- or di-laurate and mono- or di-octyl tin tri- or di-laurate, mono- or di-alkyl maleates such as mono- or di-methyl tin maleate polymer, mono- or di-butyl tin maleate polymer, mono- or di-methyl tin tris- or bis-iso-octylmaleate, mono- or di-butyl tin tris- or bis-iso-octylmaleate and mono- or di-octyl tin tris- or bis-iso-octylmaleate, and mono- or di-alkyl tin mercaptides such as mono- or di-methyl tris- or bis-iso-octylthioglycolate, mono- or di-octyl tin tris- or bis-iso-octylthioglycolate, mono- or di-butyl tin tris- or bis-thioglycolate, mono- or di-methyl tin thioglycolate or 2-mercaptopropionate, mono- or di-butyl tin thioglycolate or 2-mercaptopropionate, mono- or di-octyl tin thioglycolate or 2-mercaptopropionate, mono- or di-methyl tin tri- or di-dodecylmercaptide, mono- or di-butyl tin tri- or di-dodecylmercaptide, mono- or di-octyl tin tri- or di-dodecylmercaptide, mono- or di-methyl tin sulfide, dioctyl tin sulfide, didodecyl tin sulfide, mono- or di-methyl tin tris- or bis-2-mercaptoethyloleate, thiobis-[monomethyl tin bis(2-mercaptoethyloleate)], thiobis[-dimethyl-, dibutyl- or dioctyl tin mono-(2-mercaptoethyloleate)] and mono- or di-octyl tin-S,S'-bis(iso-octylmercaptoacetate).

The organic tin compound is used in an amount of 0.01 to 5 parts by weight, preferably 0.1 to 2 parts by weight, per 100 parts by weight of the polyvinyl chloride resin.

Resin to Be Stabilized

The resin to be stabilized in the present invention includes polyvinyl chloride, copolymers, graft polymers and block polymers comprising vinyl chloride as the main component and a monomer copolymerizable therewith, and polymer blends comprising these polymers as the main component.

Other Additives

Various additives customarily used for polyvinyl chloride resins may be incorporated in the polyvinyl chloride resin composition of the present invention in addition to the hydrotalcite (a), magnesium oxide (b), the $\beta$-diketone compound or its metal salt (c) and the organic acid salt of zinc (d) (the first aspect) or the above-mentioned components (a) and (b) and the organic tin compound (c) (the second aspect).

As examples of such additives, there can be mentioned heat stabilizers, for example, metal soap heat stabilizers such as Ca, Mg and Ba salts of fatty acids, e.g., 2-ethylhexenoic acid, lauric acid, myristic acid, palmitic acid, stearic acid, hydroxystearic acid, linoleic acid, behenic acid, isostearic acid, oleic acid and ricinoleic acid, composite metal salt heat stabilizers such as Ca/Zn and Ba/Zn salts of fatty acids as described above, epoxy compound type heat stabilizers such as epoxidized soybean oil, epoxidized linseed oil fatty acid butyl ester, epoxidized linseed oil, epoxidized 1,2-polybutadiene, bisphenol 4-diglycidyl ether, 3,4-epoxycyclohexylmethyl and 3,4-epoxycyclohexane-carboxylate, polyol type heat stabilizers such as pentaerythritol, mannitol, xylitol, sorbitol, glycerol, trimethylolpropane, polyethylene glycol, polyvinyl alcohol and sorbitan monolaurate, aminocarboxylic acid type heat stabilizers such as butane-diol $\beta$-aminocrotonic acid ester, N-acetylglutamic acid and N-acetylmethionine, sulfur-containing compound type heat stabilizers such as di-lauryl thiodipropionate and 6-anilino-1,3,5-triazine-2,4-dithiol, organic antimony type heat stabilizers such as dibutyl antimony mercapto compounds, dibutyl antimony laurate compounds, di-n-octyl antimony mercapto compounds, di-n-octyl antimony maleate compounds and di-n-octyl antimony laurate compounds, phosphite type heat stabilizers such as triaryl phosphites, e.g., triphenyl phosphite, tris(nonylphenyl)-phosphite and tris(p-nonylphenyl)phosphite, alkylaryl phosphites, e.g., monooctyldiphenyl phosphite, dioctylmonophenyl phosphite and monodecylphenyl phosphite, trialkyl phosphites, e.g., trioctyl phosphite, oligophosphites, e.g., pentaerythritol phosphite and bisphenol diphosphite and acid-phosphites, e.g., diphenyl acid-phosphite, and nitrogen-containing heat stabilizers such as urea, melamine, $\alpha$-phenylindole, diphenylthiourea and tris(2-hydroxyethyl)isocyanurate; plasticizers, for example, phosphoric acid ester stabilizers such as tributyl phosphate, triphenyl phosphate and tri-2-ethylhexyl phosphate, phthalic acid ester plasticizers such as dimethyl phthalate, dibutyl phthalate, dioctyl phthalate and di-isodecyl phthalate, aliphatic monobasic acid ester plasticizers such as butyl oleate, glycerol monooleate, butyl stearate and butyl epoxystearate, aliphatic dibasic acid ester plasticizers such as diisodecyl adipate, dibutyl adipate and di-2-ethylhexyl adipate, dihydric alcohol ester plasticizers such as diethylene glycol dibenzoate, hydroxy-acid ester plasticizers such as methyl acetylrecinoleate, chlorinated paraffin type plasticizers, and wax type plasticizers such as waxes, low-molecular-weight polystyrene and liquid paraffin; antioxidants such as 2,6-di-tert-butyl-p-cresol, 2,5-di-tert-butylhydroquinone, 2,2'-methylene-bis(4-methyl-6-tert-butylphenol), tetrakis(2,4-di-tert-butylphenol), 4,4'-bisphenylene diphosphonite, 4,4'-thiobis-(6-tert-butylphenol) and 4,4'-thiobis-(6-tert-butyl-m-cresol), octadecyl-3-(3',5'-di-tert-butyl-4'-hydroxyphenol)propionate; ultraviolet absorbents such as 2-hydroxy-4-octoxybenzophenone, 2-(2'-hydroxy-5-methylphenyl)benzotriazole and ethyl-2-cyano-3,3-diphenyl acrylate; antistatic agents such as polyethylene oxide, Carbowax, pentaerythritol monostearate, sorbitan monopalmitate and sulfated oleic acid; lubricants such as calcium stearate, zinc stearate, butyl stearate, polyethylene wax, palmitic acid amide, stearyl alcohol, ethylenebisstearoamide, glycerol trimontanate and glycerol hydroxystearate; colorants such as dye lakes, synthetic dyes and inorganic pigments; and impact strength modifiers such as MBS, ABS, chlorinated polyethylene, acrylic polymers and fibrous magnesium hydroxide.

The amounts of these additives are not particularly critical but are optionally chosen. For example, there can be mentioned a composition comprising 0.01 to 10 parts by weight of a heat stabilizer, 1 to 70 parts by weight of a plasticizer, 0.01 to 2 parts by weight of an antioxidant, 0.01 to 3 parts by weight of an ultraviolet absorbent, 0.01 to 2 parts by weight of an antistatic agent, 0.1 to 5 parts by weight of a lubricant, 0.1 to 2 parts by weight of a colorant and 1 to 20 parts by weight of an impact strength modifier per 100 parts by weight of the polyvinyl chloride resin.

The present invention will now be described in detail with reference to the following examples that by no means limit the scope of the invention.

EXAMPLES 1 THROUGH 4 AND COMPARATIVE EXAMPLES 1 AND 2

A polyvinyl chloride resin composition shown below was homogeneously mixed by a Henschel mixer and blow-formed at about 200° C. into a bottle having a capacity of 1 liter and a wall thickness of 0.5 mm by a blow-forming machine.

| Components | Amount (parts by weight) |
|---|---|
| polyvinyl chloride resin (KV = 57) | 100 |
| hydrotalcite | 0.80 |
| magnesium oxide | variable |
| zinc stearate (organic acid salt of zinc) | 0.15 |
| stearoylbenzoylmethane (β-diketone) | 0.20 |
| epoxidized soybean oil | 3.0 |
| MBS (impact strength modifier) | 6.0 |
| lubricant | 1.8 |
| Blue Lake (colorant) | 0.05 |

The hydrotalcite was one obtained by surface-treating a hydrotalcite having a BET specific surface area of 15 m$^2$/g (determined by the micro-track method), an average secondary particle size of 0.8 μm and a composition formula of $Mg_{0.53}Zn_{0.15}Al_{0.32}(OH)_2(CO_3)_{0.16} \cdot 0.42H_2O$ with 2% by weight of sodium stearate.

The magnesium oxide used had a BET specific surface area of 160 m$^2$/g and an average secondary particle size of 0.98 μm. (determined by the micro-track method)

With respect to the so-obtained bottle, the presence or absence of bubbling, the degree of bubbling, the presence or absence of discoloration and the transparency were examined with the naked eye. A sheet of 3 cm × 3 cm was cut out from the bottle, and the sheet was placed in an oven maintained at 190° C. and the time required for blackening, that is, the heat stability, was determined. The obtained results are shown in Table 1.

Incidentally, in Comparative Example 1, the magnesium oxide was not used at all, and in Comparative Example 2, the magnesium oxide was used in an amount exceeding the upper limit specified in the present invention.

In Comparative Example 3, a polyvinyl chloride resin composition described below, which comprised a Ca/Zn type composite stabilizer most customarily used at the present for food bottles, was mixed and blow-formed in the same manner as described in Example 1, and the formed bottle was evaluated.

Also the results obtained in these Comparative Examples are shown in Table 1.

| Components | Amount (parts by weight) |
|---|---|
| polyvinyl chloride resin (KV = 57) | 100 |
| calcium stearate | 0.35 |
| zinc stearate | 0.25 |
| epoxidized soybean oil | 5.0 |
| MBS | 10.0 |
| lubricant | 1.8 |
| Blue Lake | 0.05 |

TABLE 1

| | Amount (parts by weight) of Magnesium Oxide | Blow-formed Bottle | | | Heat Stability (minutes) of Sheet |
|---|---|---|---|---|---|
| | | Bubbling | Discoloration | Transparency | |
| Example 1 | 0.05 | not caused | not caused | very good | 65 |
| Example 2 | 0.10 | not caused | not caused | very good | 70 |
| Example 3 | 0.20 | not caused | not caused | very good | 75 |
| Example 4 | 1.0 | not caused | slight yellowing | slightly opaque | 80 |
| Comparative Example 1 | 0 | extreme | not caused | very good | 60 |
| Comparative Example 2 | 7.0 | not caused | clear yellowing | opaque | 90 |
| Comparative Example 3 | 0 | not caused | yellowing | considerably opaque | 35 |

EXAMPLE 5

A polyvinyl chloride resin composition comprising 100 parts by weight of a polyvinyl chloride resin (KV=60), 1.0 part by weight of a hydrotalcite, 1.0 part by weight of di-n-octyl tin S,S'-bis(iso-octylmercaptoacetate), 0.1 part by weight of magnesium oxide, 0.5 part by weight of glycerol recinoleate and 0.8 part by weight of a lubricant was homogeneously mixed by a Henschel mixer and was molded into a sheet having a thickness of 1 mm at about 210° C. by a calender molding machine. A test piece of 10 cm×10 cm was cut out from the sheet and the presence or absence of blowing and the transparency were examined. Furthermore, a test piece of 3 cm×3 cm was cut out from the sheet and placed in an oven maintained at 190° C., and the heat stability was evaluated. The obtained results are shown in Table 2.

The hydrotalcite used was one obtained by surface-treating a hydrotalcite having a BET specific surface area of 12 m²/g, an average secondary particle size of 0.9 μm and a composition formula of $Mg_{0.7}Al_{0.3}(OH)_2$—$(CO_3)_{0.15}.0.55H_2O$ with about 1% by weight of a silane type coupling agent (γ-aminosilane) and heating the surface-treated hydrotalcite in an oven maintained at 250° C. for 1 hour to dissociate water of crystallization to $0.12H_2O$.

The magnesium oxide used had a BET surface area of 105 m²/g and an average secondary particle size of 1.5 μm.

COMPARATIVE EXAMPLE 4

The procedures of Example 5 were repeated in the same manner except that the magnesium oxide was not incorporated. The obtained results are shown in Table 2.

COMPARATIVE EXAMPLE 5

The procedures of Example 5 were repeated in the same manner except that the magnesium oxide and dioctyl tin mercaptide were not incorporated. The obtained results are shown in Table 2.

TABLE 2

| | Amount (parts by weight) of Magnesium Oxide | Properties of Sheet | | | Heat Stability (minutes) |
|---|---|---|---|---|---|
| | | Bubbling | Smell | Transparency | |
| Example 5 | 0.1 | not caused | no substantial smell | very good | 80 |
| Comparative Example 4 | 0 | extreme blowing | strong smell | very good | 80 |
| Comparative Example 5 | 0 | not caused | no substantial smell | very good | 60 |

We claim:

1. A stabilized polyvinyl chloride resin composition comprising 100 parts by weight of a polyvinyl chloride resin and, incorporated therein, (a) 0.05 to 10 parts by weight of a hydrotalcite, (b) 0.01 to 5 parts by weight of magnesium oxide, (c) 0.01 to 5 parts by weight of a β-diketone compound and (d) 0.01 to 5 parts by weight of an organic acid salt of zinc.

2. A stabilized polyvinyl chloride resin composition as set forth in claim 1, wherein the magnesium oxide has a specific surface area of at least 50 m²/g and an average secondary particle size smaller than 5 μm.

3. A stabilized polyvinyl chloride resin composition as set forth in claim 1, wherein the hydrotalcite has a composition represented by the following formula (1):

$$M^{2+}{}_{1-x}Al_x(OH)_2A^{n-}{}_{x/n}\cdot mH_2O \qquad (1)$$

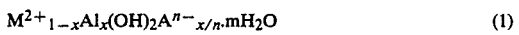

wherein $M^{2+}$ stands for Mg or a solid solution of Mg and Zn, $A^{n-}$ stands for an anion having a valency of n, x is a positive number of $0-x<0.5$, and m is a positive number of $0 \leq m < 1$.

4. A stabilized polyvinyl chloride resin composition comprising 100 parts by weight of a polyvinyl chloride resin and, incorporated therein, (a) 0.05 to 10 parts by weight of a hydrotalcite, (b) 0.01 to 5 parts by weight of magnesium oxide and (c) 0.01 to 5 parts by weight of an organic tin compound.

5. A stabilized polyvinyl chloride resin composition as set forth in claim 4, wherein the magnesium oxide has a specific surface area of at least 50 m²/g and an average secondary particle size smaller than 5 μm.

6. A stabilized polyvinyl chloride resin composition as set forth in claim 4, wherein the hydrotalcite has a composition represented by the following formula (1):

$$M^{2+}{}_{1-x}Al_x(OH)_2A^{n-}{}_{x/n}\cdot mH_2O \qquad (1)$$

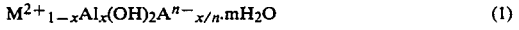

wherein $M^{2+}$ stands for Mg or a solid solution of Mg and Zn, $A^{n-}$ stands for an anion having a valency of n, x is a positive number of $0<x<0.5$, and m is a positive number of $0 \leq m < 1$.

* * * * *

UNITED STATES PATENT AND TRADEMARK OFFICE
CERTIFICATE OF CORRECTION

PATENT NO. : 4,751,261
DATED : June 14, 1988
INVENTOR(S) : SHIGEO MIYATA ET AL.

It is certified that error appears in the above-identified patent and that said Letters Patent is hereby corrected as shown below:

Claim 3, line 7 of the claim, "0-x<0.5" should read --0<x<0.5--.

Signed and Sealed this

Fifteenth Day of November, 1988

*Attest:*

DONALD J. QUIGG

*Attesting Officer*   *Commissioner of Patents and Trademarks*